Sept. 17, 1968 R. D. RUMSEY 3,401,947
RING SEAL COROTATIVE WITH A SHAFT
Filed Sept. 22, 1965 2 Sheets-Sheet 1
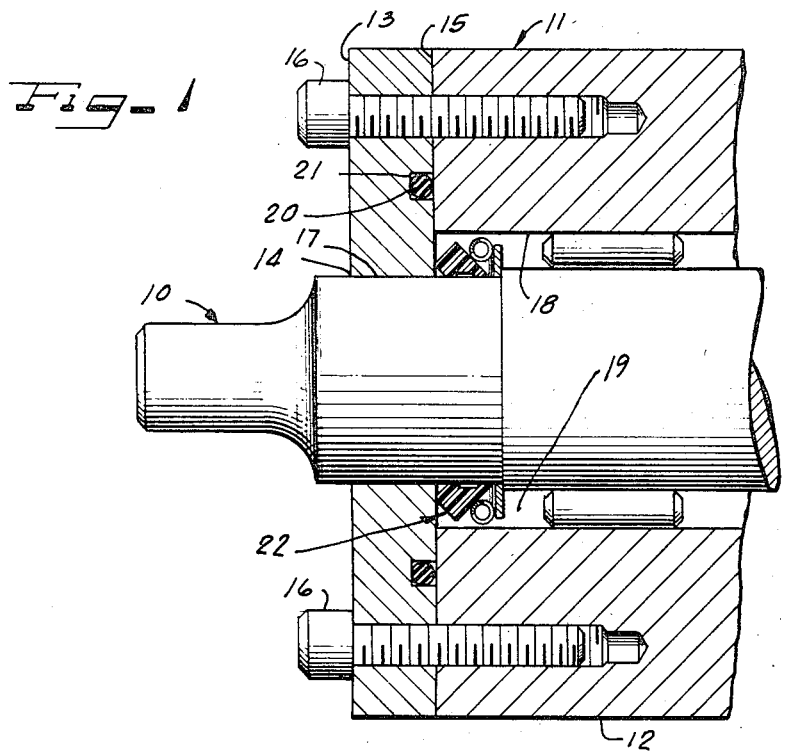
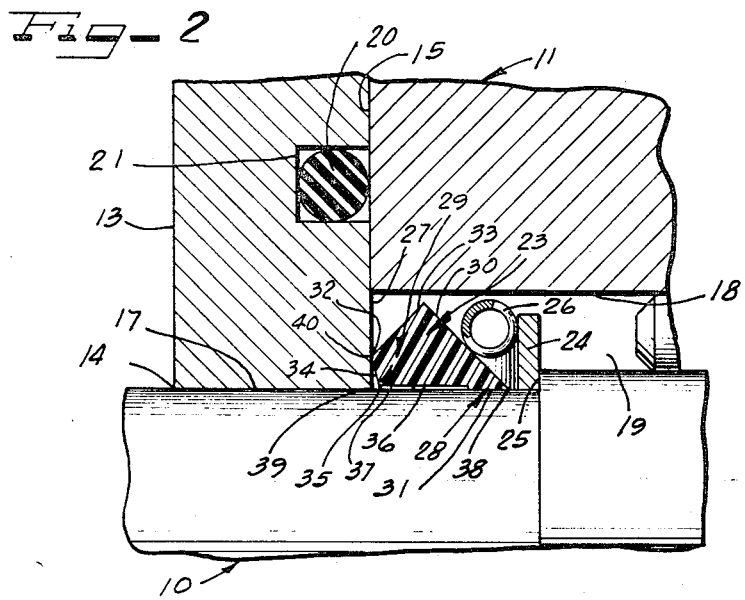
INVENTOR.
ROLLIN DOUGLAS RUMSEY
BY
ATTORNEYS

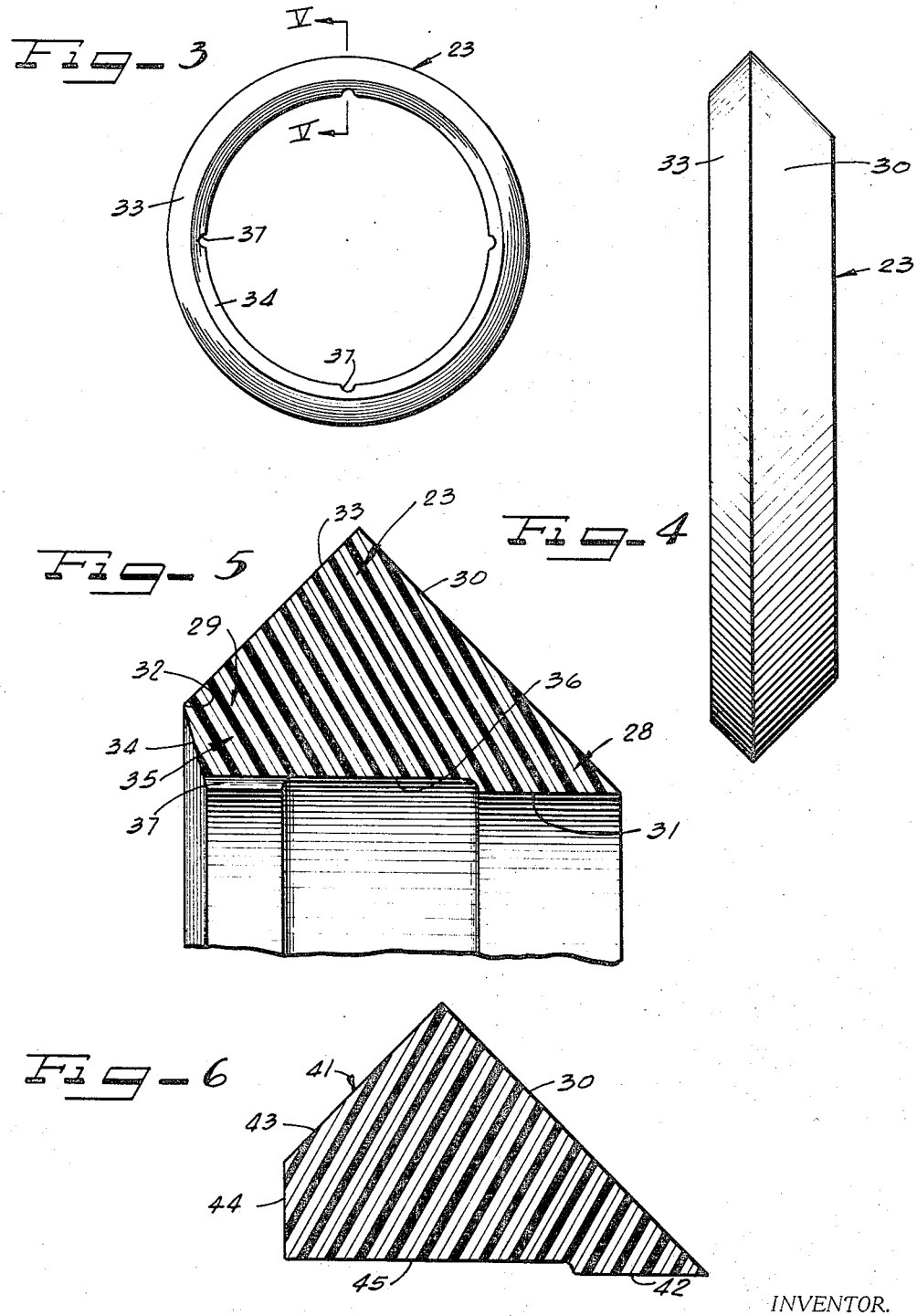

United States Patent Office 3,401,947
Patented Sept. 17, 1968

3,401,947
RING SEAL COROTATIVE WITH A SHAFT
Rollin Douglas Rumsey, Buffalo, N.Y., assignor to Houdaille Industries, Inc., Buffalo, N.Y., a corporation of Michigan
Filed Sept. 22, 1965, Ser. No. 489,325
13 Claims. (Cl. 277—84)

ABSTRACT OF THE DISCLOSURE

A ring seal for a shaft having a static sealing toe and a dynamic sealing head. The static sealing toe has an inner sealing surface which contacts the surface of a shaft being sealed thereby, and the dynamic sealing head has a sealing nose for contacting a relatively moving surface which is being sealed relative to the shaft. Means are provided for maintaining the corotative relationship between the inner sealing surface of the sealing toe and the shaft, while maintaining the dynamic relationship between the sealing nose and the relatively moving surface being sealed with respect to the shaft.

---

This invention relates to a shaft seal and in particular to a sealing ring utilizing fluid pressure for maintaining a static seal with a moving shaft and a dynamic seal with a stationary shaft housing.

In manufacturing certain hydraulically actuated devices, an important objective has been the development of a suitable low cost shaft seal. Prior shaft seals have not been entirely satisfactory in that they have permitted a low level leakage and have been characterized by early failure.

Low level leakage has occurred due to the undermining of the seal by hydraulic pressure, while early failure has been experienced either due to the use of seals too soft to sustain continued rotational motion or due to relative movement developing between the seal and shaft.

It is apparent that in such applications as scientific instruments, food handling machinery, hospital equipment, and machines subject to fire risks, that external leakage from the shaft seal is intolerable. Also early failure of the shaft seal has had the effect of increasing the cost of maintaining such equipment. Especially failure due to relative motion between the seal and shaft significantly increases the maintenance cost insofar as the shaft invariably requires replacement because of irreparable wear at the shaft surface.

Therefore it is an object of this invention to provide a shaft seal for eliminating low level leakage and which is characterized by increased longevity.

It is also an object of this invention to provide a shaft sealing structure which substantially eliminates relative motion between the shaft and the sealing member.

It is another object of this invention to provide a shaft seal utilizing hydraulic pressure for assuring a stationary relationship between the shaft and the sealing member and a dynamic relationship between the sealing member and a surface of the shaft housing.

It is a further object of this invention to provide a shaft seal having an area subject to fluid pressure in the direction of the shaft significantly greater than the area subject to fluid pressure urging the seal toward a sealing face on the shaft housing.

It is an additional object of this invention to provide a shaft seal which is preloaded against both a shaft surface and a shaft housing surface by the constricting effect of a garter spring.

These and other objects, features and advantages of the present invention will be understood in greater detail from the following description and the associated drawings wherein reference numerals are utilized in designating a preferred embodiment and wherein:

FIGURE 1 is a sectional view of a shaft and housing assembly illustrating a typical working environment for the shaft seal structure of this invention;

FIGURE 2 is an enlarged view of a portion of FIGURE 1 for emphasizing the structural relationship between the cooperating sealing elements;

FIGURE 3 is a plan view of the sealing ring of this invention as illustrated in the assembly of FIGURE 2;

FIGURE 4 is a side elevational view of the sealing ring illustrated in FIGURE 3;

FIGURE 5 is a sectional view taken along the lines V—V of FIGURE 3 and illustrating the structural orientation of the sealing surfaces; and FIGURE 6 is a sectional view similar to that shown in FIGURE 5 and illustrating a modified embodiment of the sealing ring of this invention.

A general working environment for the shaft seal of this invention is shown in FIGURE 1 as comprising a shaft 10 mounted for rotation within a housing 11. The housing 11 comprises a main body 12 and a cover plate 13 having a central opening 14 fitted about the shaft 10. The cover plate 13 is secured to an end face 15 of the body 12 by a plurality of bolts 16.

The shaft 10 is mounted axially of the housing 11 and has a cylindrical surface 17 spaced inwardly of an inner surface 18 of the body 12. The spacing between the surfaces 17 and 18 forms a pressure chamber 19 which is directly connected to a source of hydraulic fluid. The fluid pressure within the chamber 19 may be employed to impart a rotary motion to the shaft 10 or to perform other hydraulic functions. It is apparent, however, that means must be provided to assure that leakage does not occur from the chamber 19 to points external of the shaft and housing assembly.

In FIGURE 1, two sets of seals are provided to prevent leakage from the chamber 19. First, an O-ring 20 is fitted within a groove 21 formed at the inner surface of the cover plate 13. The O-ring 20 is compressed between the face 15 of the body 12 and the groove 21 to provide a pressure tight seal for the junction of the cover plate and the main body 12. Second, the sealing assembly of this invention, indicated generally in FIGURE 1 by the reference numeral 22, is disposed about the shaft 10 to provide a pressure tight seal between the chamber 19 and the opening 14 of the cover plate 13. Unlike the O-ring 20 the sealing assembly 22 must provide a pressure tight seal between relatively moving members, namely, between the cover plate 13 and the relatively moving shaft 10.

In FIGURE 2 the sealing assembly 22 is shown in greater detail as comprising a sealing ring 23 fitted about the shaft 10, a washer 24 mounted against a shoulder 25 formed integrally with the shaft 10, and a garter spring 26 disposed intermediate the sealing ring 23 and the washer 24.

According to the present invention assurance against leakage between the chamber 19 and points externally of the shaft and housing assembly through the opening 14 is afforded by a single sealing element which contacts both the cylindrical surface 17 of the shaft 10 and the inner surface 27 of the cover plate 13. Furthermore, the contact between the sealing element and the respective surfaces is of a sufficient force to maintain a continuity of engagement under varying circumstances. To accomplish this objective, the sealing ring 23 is provided with a sealing toe 28 for contacting the surface 17 of the shaft 10 and a sealing head 29 for contacting the inner surface 27 of the cover plate 13. The contact force at both the toe 28 and the head 29 is provided in part by the garter spring 26. In particular, the garter spring 26 is disposed between the washer 24 and a wedging pressurizing surface 30 formed obliquely to both the shaft 10 and the cover plate 13. In this way, the garter spring 26 imparts to the sealing ring 23 a component of force directed perpendicularly to the shaft 10 for maintaining the contact of the sealing toe 28 and a component of force perpendicular to the inner face 27 of the cover plate 13 for maintaining the contact of the sealing head 29.

Referring to the sealing ring 23 in greater detail, the sealing toe 28 has an inner sealing surface 31 formed concentric with the axis of the ring 23 and provided to be complementary with the outer surface 17 of the shaft 10 to prevent the leakage of fluid therebetween. Formed oppositely to the sealing toe 28, the sealing head 29 is provided with a sealing nose 32 also formed concentric to the axis of the ring 23 and provided to contact the inner surface 27 of the cover plate 13.

The sealing nose 32 is formed at the junction of an outer sloped face 33 and an inner sloped face 34 of the ring 23. It may be noted that both the faces 33 and 34 are sloped rearwardly of the sealing nose 32. This has the effect of minimizing the contact area between the sealing ring 23 and the cover plate 13. It is apparent that by minimizing the contact area an improved sealing function can be achieved with less precision in the machining of the sealing surfaces, thereby minimizing the cost of manufacture and maintenance.

The inner sloped surface 34 extends from the sealing nose 32 to a pressure relief heel 35. The pressure relief heel 35 is distinct from the sealing toe 28 through the provision for a spacer groove 36 formed at the inner surface of the ring 23. The spacer groove 36 has the effect of minimizing the contact area of the inner sealing surface 31 of the toe 28 and thereby increases the sealing quality between the surface 31 and the shaft 10. The pressure relief heel 35 is provided with a series of notches 37 formed parallel to the axis of the ring 23 which prevent a pressure build up beneath the heel allowing the seal to be forced against the shaft due to the fluid pressure in the chamber 19.

The sealing ring 23 of this embodiment is formed of glass filled Teflon, Teflon being a trade name for a tetrafluoroethylene polymer. This composition provides both strength for the ring structure and a continuous lubricity between the relatively moving surfaces. However, due to the durable nature of the Teflon material, it is important that the sealing ring 23 be maintained relatively stationary with the shaft 10. This is because the continuous movement of the Teflon substance against the outer surface of the shaft 10 will gradually wear a groove therein and necessitate the replacement of the shaft. By assuring that the ring 23 is maintained stationary relative to the shaft 10, it is apparent that the sealing nose 32 will be caused to move with the shaft relative to the inner surface 27 of the cover plate 13. Therefore, after repeated use, wear may be expected at the inner surface 27. However, the surface 27 offers a plane face which may be refinished which is in contrast to the circumstance of wear occurring at the cylindrical surface 17 of the shaft 10.

The sealing ring 23 is structured to utilize fluid pressure within the chamber 19 for maintaining a stationary relationship between that ring and the shaft 10 and consequently a movable or dynamic relationship between the sealing head 29 and the cover plate 13. It is recognized that fluid pressure is equal at all points within the chamber 19 and is directed perpendicular to the inner surface of the chamber. Therefore, by providing the sealing ring 23 to have an area subject to this fluid presure which is greater in the direction of the shaft 10 than in the direction of the cover plate 13, the fluid pressure may be utilized to develop a tighter grip between the ring and shaft than between the ring and plate resulting in the desired static and dynamic conditions.

In FIGURE 2 it is apparent that fluid pressure from within the chamber 19 is exerted on the ring 23 at the pressurizing surface 30 and the outer sloped face 33. The fluid pressure is directed normal or perpendicular to these surfaces, and the net effect may be equated to force components acting perpendicular to the shaft 10 between the points 38 and 39 and equal force components acting perpendicular to the cover plate 13 between the points 39 and 40. Therefore, the total fluid pressure urging the sealing ring 23 toward the shaft 10 is related to the fluid pressure urging the sealing ring 23 against the cover plate 13 by the ratio of the shaft area between the points 38 and 39 to the cover plate area between the points 39 and 40. It is apparent from FIGURE 2 that the area of the shaft 10 susceptible to pressure from the chamber 19 is substantially greater than the area of the cover plate 13 susceptible to that pressure. Since the total friction force is proportional to area, the friction associated with the toe 28 will be increased disproportionately over the friction associated with the nose 32 by the presence of pressurized fluid within the chamber 19. In this way, the sealing ring 23 is caused to rotate with the shaft 10 and to provide a moving or dynamic seal with the cover plate 13.

An alternate form of this invention is shown in FIGURE 6 as comprising a sealing ring 41 having a sealing toe 42 similar to the toe 28 of the ring 23. Unlike the ring 23, the ring 41 is provided with a sealing head 43 having a blunt or flat sealing nose 44. Therefore, the area of contact between the ring 41 will be considerably greater than the area of contact illustrated in FIGURE 2 between the sealing nose 32 and the inner surface 27 of the cover plate 13. The ring 41 may be utilized in circumstances where wear on the inner surface 27 is especially critical and where facilities are not readily available for refinishing the contact surface 27. It may be noted that the heel 35 associated with the sealing ring 23 of FIGURE 2 is absent in the sealing ring 41 of FIGURE 6. However, due to the blunt or flat sealing nose 44 in conjunction with the pressure applied by the garter spring 26 the inner surface 45 may be maintained in a spaced relation with the surface 17 of the shaft 10.

It will be understood that various modifications may be suggested by the embodiment disclosed, but I desire to claim within the scope of the patent warranted hereon all such modifications as come within the scope of my invention.

I claim:

1. A sealing ring for a shaft comprising:
   a ring body having a static sealing toe and a pressure relief heel disposed inwardly of said ring body at opposite sides thereof,
   said static sealing toe having an inner sealing surface and said pressure relief heel having an inner relief surface,
   said inner sealing surface and said inner relief surface being formed concentric to the axis of said ring body,
   means for urging said inner sealing surface into corotative relation with a shaft being sealed thereby,
   a spacer groove disposed intermediate said static sealing toe and said pressure relief heel and having an inner surface thereof spaced radially outwardly of said concentric sealing and relief surfaces,
   said ring body having a dynamic sealing head formed at one side thereof,
   said dynamic sealing head having a sealing nose protruding outwardly therefrom and being concentric to the axis of said ring body for contacting a relatively moving surface.

2. In a sealing ring according to claim 1, said sealing nose comprising a point of convergence of two annular surfaces.

3. A shaft sealing ring comprising:
   a ring body having a static sealing toe and a pressure relief heel disposed inwardly of said ring body at opposite sides thereof,
   said static sealing toe having an inner sealing surface and said pressure relief heel having an inner relief surface, said inner sealing surface and said inner relief surface being formed concentric to the axis of said ring body, means for urging said inner sealing surface into corotative relation with a shaft, a spacer groove disposed intermediate said static sealing toe and said pressure relief heel and having an inner surface thereof spaced radially outwardly of said concentric sealing and relief surfaces, said ring body having a dynamic sealing head formed at a side thereof adjacent to said pressure relief heel, said dynamic sealing head having a sealing nose protruding outwardly therefrom and being concentric to the axis of said ring body for contacting a relatively moving surface, said inner sealing surface, spacer surface, and relief surface having a combined area substantially greater than the area of said dynamic sealing head between said relief surface and said sealing nose.

4. A shaft sealing ring comprising:

a ring body having a static sealing toe and a pressure relief heel disposed inwardly of said ring body at opposite sides thereof, said static sealing toe having an inner sealing surface and said pressure relief heel having an inner relief surface, said inner sealing surface and said inner relief surface being formed concentric to the axis of said ring body, means for urging said inner sealing surface into corotative relation with a shaft being sealed thereby, said inner relief surface having a plurality of notches formed thereon substantially parallel to the axis of said ring body, said ring body having a dynamic sealing head formed at one side thereof, said dynamic sealing head having a sealing nose protruding outwardly therefrom and being concentric to the axis of said ring body for contacting a relatively moving surface.

5. A shaft sealing ring comprising:

a ring body having a static sealing toe and a pressure relief heel disposed inwardly of said ring body at opposite sides thereof, said static sealing toe having an inner sealing surface and said pressure relief heel having an inner relief surface, said inner sealing surface and said inner relief surface being formed concentric to the axis of said ring body, said inner relief surface having a plurality of notches formed thereon substantially parallel to the axis of said ring body, means for urging said inner sealing surface into corotative relation with a shaft being sealed thereby, a spacer groove disposed intermediate said static sealing toe and said pressure relief heel and having an inner surface thereof spaced radially outwardly of said concentric sealing and relief surfaces, said inner surface of said spacer groove being formed concentric to the axis of said ring body, said ring body having a dynamic sealing head formed at one side thereof, said dynamic sealing head having a sealing nose protruding outwardly therefrom and being concentric to the axis of said ring body for contacting a relatively moving surface.

6. A sealing ring for a shaft comprising:

a ring body having a static sealing toe and a pressure relief heel disposed inwardly of said ring body at opposite sides thereof, said static sealing toe having an inner sealing surface and said pressure relief heel having an inner relief surface, said inner sealing surface and said inner relief surface being formed concentric to the axis of said ring body, a pressurizing surface formed obliquely of said inner sealing surface and extending from said sealing toe to a point outwardly thereof, said pressurizing surface and said inner sealing surface forming an acute angle thereby, means associated with said pressurizing surface for maintaining said sealing surface in corotative relation with a shaft being sealed thereby, said ring body having a dynamic sealing head formed at one side thereof, said dynamic sealing head having a sealing nose protruding outwardly therefrom and being concentric to the axis of said ring body for contacting a relatively moving surface.

7. A shaft sealing ring as described in claim 6 wherein said pressurizing surface forms an angle of 45° with said inner sealing surface.

8. A shaft sealing ring comprising:

a ring body having a static sealing toe and a pressure relief heel disposed inwardly of said ring body at opposite sides thereof, said static sealing toe having an inner sealing surface and said pressure relief heel having an inner relief surface, said inner sealing surface and said inner relief surface being formed concentric to the axis of said ring body, a spacer groove disposed intermediate said static sealing toe and said pressure relief heel and having an inner surface thereof spaced radially outwardly of said concentric sealing and relief surfaces, a crest defining the outermost edge of said ring body, a pressurizing surface extending from said sealing toe to said crest and forming an acute angle with said inner sealing surface thereby, said ring body having a dynamic sealing head formed oppositely of said pressurizing surface, said dynamic sealing head having a sealing nose protruding outwardly therefrom and being concentric to the axis of said ring body for contacting a relatively moving surface, said inner sealing surface, spacer surface, and relief surface having a combined area substantially greater than the area of said dynamic sealing head between said relief surface and said sealing nose, an outer sloped face extending obliquely from said sealing nose to said crest and an inner sloped face extending obliquely from said sealing nose to said pressure relief heel.

9. The combination of:

a housing, a wall of said housing having an opening formed therein, a shaft rotatably mounted within said housing and extending through said opening, a flange disposed about said shaft, a sealing ring mounted about said shaft intermediate said flange and said wall and having an inner sealing surface formed concentric to the axis thereof for contacting the outer surface of said shaft, a pressurizing surface formed obliquely of said inner sealing surface and defining an acute angle therewith, said sealing ring having a dynamic sealing head formed oppositely of said pressurizing surface for contacting said wall, a resilient means disposed between said flange and said sealing ring and exerting a force on said pressurizing surface for urging said sealing ring against both said shaft and said wall and into corotative relation with said shaft.

10. A combination according to claim 9, having on the sealing head an annular sealing nose point which contacts said wall.

11. The combination of:
   a housing,
   a wall of said housing having an opening formed therein,
   a shaft rotatably mounted within said housing and extending through said opening,
   a flange disposed about said shaft,
   a sealing ring mounted about said shaft intermediate said flange and said wall,
   said sealing ring having a static sealing toe disposed inwardly thereof,
   said static sealing toe having an inner sealing surface formed concentric to the axis of said sealing ring for contacting the outer surface of said shaft,
   a pressurizing surface formed obliquely of said inner sealing surface and extending from said sealing toe to a point outwardly thereof, said pressurizing surface and said inner sealing surface forming an acute angle thereby,
   said sealing ring having a dynamic sealing head formed oppositely of said pressurizing surface,
   said dynamic sealing head having a sealing nose protruding outwardly therefrom and being concentric to the axis of said sealing ring for contacting said wall,
   a garter spring tensioned about said shaft intermediate said flange and said sealing ring and exerting a force substantially perpendicular to said pressurizing surface and maintaining said sealing ring contiguous with both said shaft and said wall and maintaining said inner sealing surface in corotative relation with said shaft.

12. The combination as described in claim 11 wherein a shoulder is formed integrally with said shaft and wherein said flange comprises a washer fitted about said shaft and axially positioned against said shoulder by said garter spring.

13. The combination of:
   a housing,
   a wall of said housing having an opening formed therein,
   a shaft rotatably mounted within said housing and extending through said opening,
   a flange disposed about said shaft,
   a ring body mounted about said shaft,
   a static sealing toe and a pressure relief heel disposed inwardly of said ring body at opposite sides thereof,
   said static sealing toe having an inner sealing surface and said pressure relief heel having an inner relief surface,
   said inner sealing surface and said inner relief surface being formed concentric to the axis of said ring body,
   a pressurizing surface formed obliquely of said inner sealing surface and extending from said sealing toe to a point outwardly thereof,
   said pressurizing surface and said inner sealing surface forming an acute angle thereby,
   a spacer groove disposed intermediate said static sealing toe and said pressure relief heel and having an inner surface thereof spaced radially outwardly of said concentric sealing and relief surfaces,
   said ring body having a dynamic sealing head formed at a side thereof adjacent to said pressure relief heel,
   said dynamic sealing head having a sealing nose protruding outwardly therefrom and being concentric to the axis of said ring body for contacting said wall,
   said inner sealing surface, spacer surface, and relief surface having a combined area substantially greater than the area of said dynamic sealing head between said relief surface and said sealing nose,
   a garter spring tensioned about said shaft intermediate said flange and said ring body and exerting a force substantially perpendicular to said pressurizing surface and maintaining said ring body contiguous with both said shaft and said wall.

References Cited

UNITED STATES PATENTS

| | | | |
|---|---|---|---|
| 2,998,987 | 9/1961 | Taschenberg et al. | 277—144 |
| 3,097,855 | 7/1963 | Allen | 277—188 |
| 3,109,661 | 11/1963 | Swain et al. | 277—165 X |
| 3,119,623 | 1/1964 | Sherchenko | 277—144 X |
| 3,218,087 | 11/1965 | Hallesy | 277—165 X |
| 3,275,334 | 9/1966 | Voitik | 277—84 X |
| 3,010,742 | 11/1961 | Kosatka | 277—95 |

FOREIGN PATENTS

| | | |
|---|---|---|
| 204,789 | 10/1923 | Great Britain. |
| 1,155,644 | 10/1963 | Germany. |

SAMUEL ROTHBERG, *Primary Examiner.*